Figure 1:
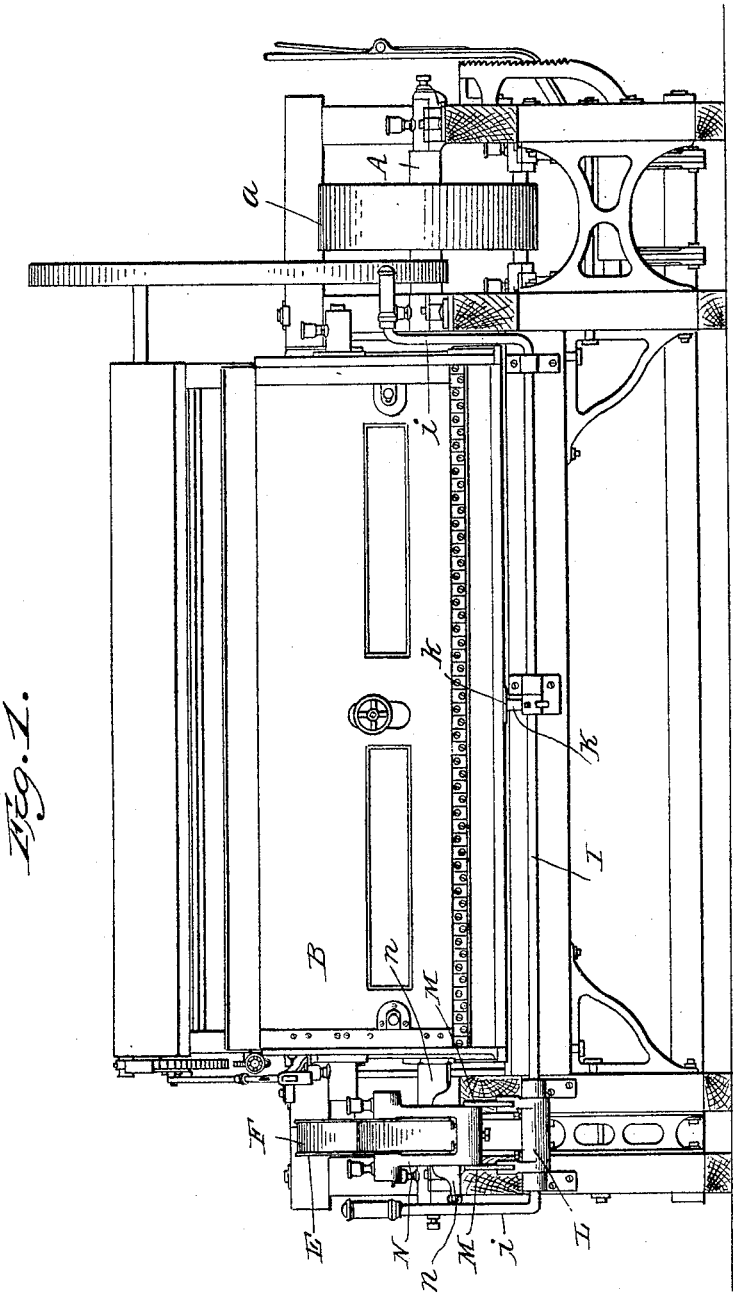

No. 799,427. PATENTED SEPT. 12, 1905.
R. E. WILSON.
COTTON GIN.
APPLICATION FILED MAR. 29, 1905.

3 SHEETS—SHEET 1.

Witnesses:
Edwin L. Yewell
Thomas Durant

Inventor
Ralph E. Wilson,
By Church & Church
his Attorneys

No. 799,427. PATENTED SEPT. 12, 1905.
R. E. WILSON.
COTTON GIN.
APPLICATION FILED MAR. 29, 1905.
3 SHEETS—SHEET 2.
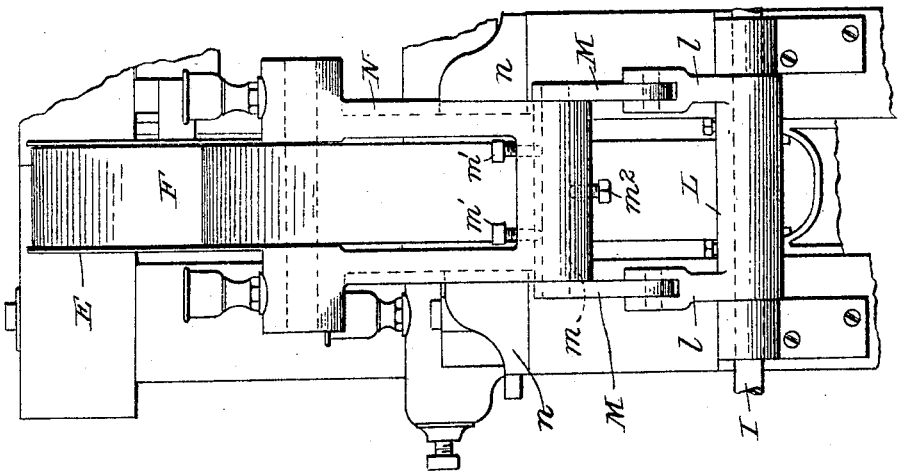
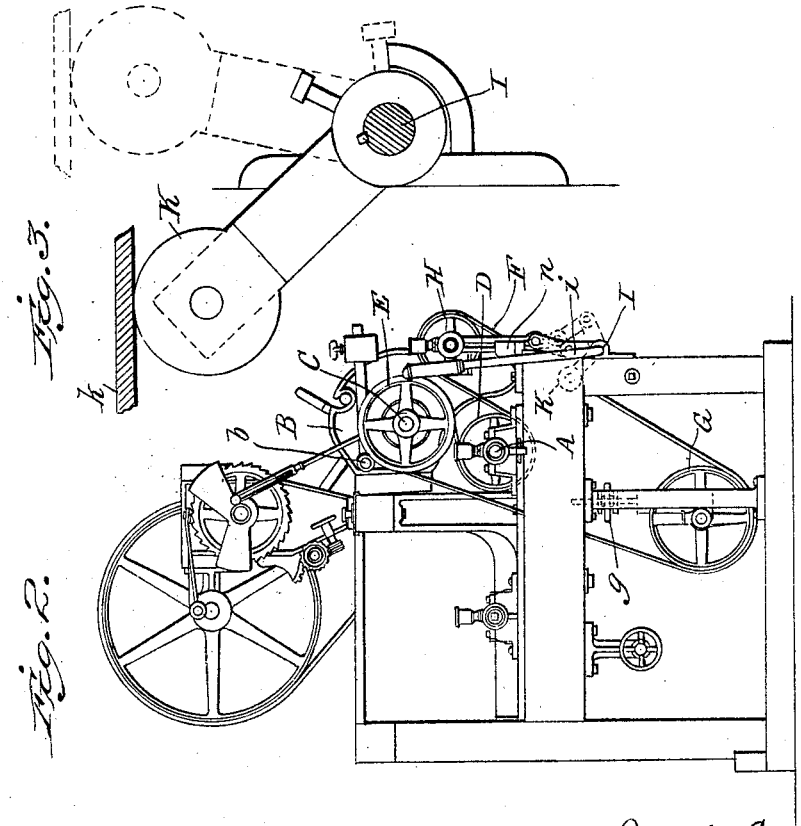

No. 799,427. PATENTED SEPT. 12, 1905.
R. E. WILSON.
COTTON GIN.
APPLICATION FILED MAR. 29, 1905.
3 SHEETS—SHEET 3.
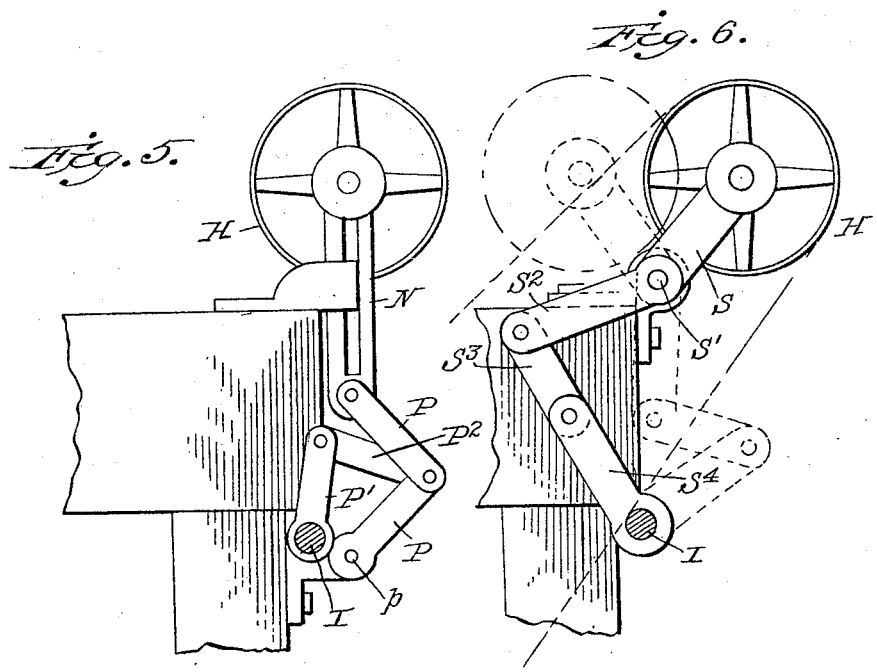
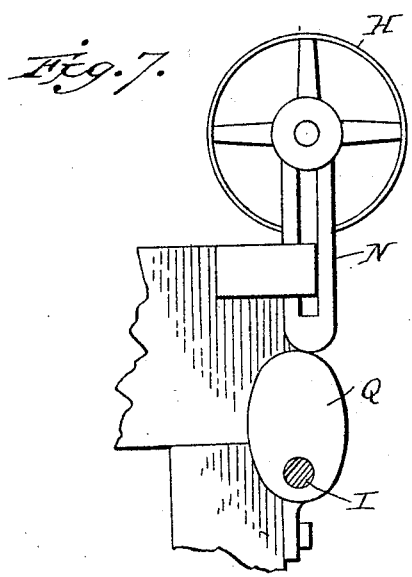
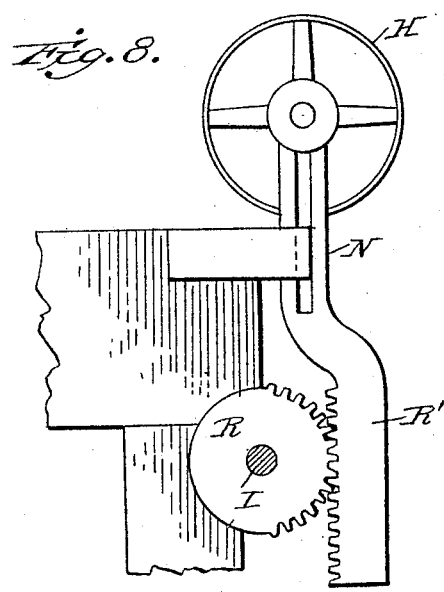
Witnesses
Edwin L. Yewell
Thomas Durant
Inventor
Ralph E. Wilson
By
his Attorneys

UNITED STATES PATENT OFFICE.

RALPH E. WILSON, OF DALLAS, TEXAS, ASSIGNOR TO THE CONTINENTAL GIN COMPANY, OF BIRMINGHAM, ALABAMA, A CORPORATION OF DELAWARE.

COTTON-GIN.

No. 799,427.   Specification of Letters Patent.   Patented Sept. 12, 1905.

Application filed March 29, 1905. Serial No. 252,687.

*To all whom it may concern:*

Be it known that I, RALPH E. WILSON, of Dallas, in the county of Dallas and State of Texas, have invented certain new and useful Improvements in Cotton-Gins; and I do hereby declare the following to be a full, clear, and exact description of the same, reference being had to the accompanying drawings, forming a part of this specification, and to the letters of reference marked thereon.

This invention relates particularly to that class of machines employing saws or equivalent lint-removing mechanism and designed more especially for reginning or delinting cotton-seed in order to prepare the seed for subsequent use, particularly for use by the manufacturers of cotton-seed oil, although the invention might well be applied to other types of gin.

One object of the invention is to provide a highly-efficient driving mechanism for the float, which latter passes through the roll-box and shifts or revolves the roll of seed so as to continuously present fresh seed to the saws.

Another object of the invention is to provide a driving mechanism which will permit the motion of the float to be instantly arrested when from any cause it is desired or necessary to stop the delinting process.

Another object of the invention is to provide a mechanism whereby when for any cause it is necessary to raise the linter-breast or roll-box away from the saw the float will be instantly and automatically stopped or the float shall be stopped as a preliminary step to raising the linter-breast or roll-box.

The invention consists, primarily, in a gin embodying a float and a driving mechanism therefor, which normally tends to hold the float in its operative position.

Further, the invention consists in a gin embodying a float mounted in a movable roll box or breast and a driving mechanism for the float operating to hold the float and box down in working position.

Further, the invention consists in a gin embodying a float mounted in a movable roll box or breast, a driving mechanism for the float, and a mechanism for lifting the roll box or breast, said mechanism also controlling the driving mechanism for the float to release the float from the operation of the driving mechanism.

The invention further consists in certain novel details of construction and combinations and arrangements of parts, all as will be now described, and pointed out particularly in the appended claims.

Referring to the accompanying drawings, Figure 1 is a front elevation of a delinting-gin embodying the present improvements. Fig. 2 is a side elevation of the same with the controlling devices for the driving mechanism dotted in the positions they occupy when the roll-box is raised to stop the ginning operation. Fig. 3 is a detail section to show the operation of the breast or box lift cam. Fig. 4 is an enlarged front elevation of the idler-pulley-operating mechanism. Figs. 5, 6, 7, and 8 are elevations of modified forms of idler-pulley-operating mechanisms.

Similar letters of reference in the several figures indicate the same parts.

To enable the present invention to be clearly understood by those skilled in the art, it is unnecessary to illustrate the internal construction or describe in detail the several well-known parts of the gin further than to say that A indicates the saw-shaft, journaled in the frame in the usual way; B, the movable roll box or breast, pivoted at $b$, as usual, so that it may be swung up away from the saws; C, the float-shaft, journaled in the ends of the roll-box, the float carried by the shaft being of any well-known type and operating as usual. As shown in the drawings, the saw-shaft A is provided with a drive-pulley $a$ at the right in Fig. 1 and on its opposite end with a pulley D. Immediately above and forward of pulley D is the somewhat larger pulley E on the float-shaft C, and a belt F, passing in opposite directions around these pulleys, serves to impart movement to the float-shaft. The belt F also passes around a tightener-pulley G, preferably located near the bottom of the frame and adapted to be adjusted by a screw and hand-wheel $g$ to take up slack or stretch in the belt. The belt also passes around a movable idler-pulley H, the latter when in operative position preferably being located forward and above the saw-shaft. The arrangement of the pulleys D, E, and H is such that the belt passes around or makes contact with a large part of their peripheries, especially of the pulleys D and E, in order to secure the maximum tractive force. The arrangement of the pulleys is also such that the tension of the belt tends to hold the float and roll-box down to its working position. Then when the lint-seed accumulates in the box and tends to raise the same from the saws or to arrest the movement of the float slippage in the driving mechanism is prevented and the best results may be secured. In this connection it may be noted that practice has demonstrated that to secure such results a very tight roll of seed must be run in the roll-box, and prior to my present invention after the roll-box had been filled with seed beyond a certain density slippage in the driving mechanism took place, and hence the desired results could not be secured.

The idler-pulley H, before referred to as movable, constitutes a part of the controlling devices for the driving mechanism, and in the highest development of the invention said pulley is so connected with the mechanism for raising the roll-box that it will be moved to release the tension on the belt during the initial movement to raise the box or breast and to keep the belt slack until the box or breast is again lowered. Thus as a preliminary step in the raising of the box the float is stopped, and no further ginning will take place until the box is lowered.

In the preferred construction illustrated in Figs. 1 to 4, inclusive, a breast-lift rod in the form of a shaft I, extending across the machine and provided at one end with a crank or handle $i$, is employed. This rod is journaled on the main frame and at an intermediate point carries a breast-lift cam K, adapted to work against a rub-plate $k$ on the lower rib-rail of the roll-box, so as to raise or lower the box, as will be readily understood from Fig. 3. In operation it is preferred that the cam shall work across its center, so that it will operate when turned beyond its highest point to hold the box raised and with the mechanism to be presently described in its inoperative position. Obviously any well-known form of catch or retainer may be employed, however, instead of having the cam work past its center, and any suitable stops may be used to limit the range of movement. In addition to the cam K the breast-lift rod is provided in the figures last referred to with a lever-arm, preferably a sleeve L, having two arms $l$, adapted to be connected by links M with a cross-shaft $m$ in the lower end of the frame N, in which the idler-pulley H is journaled. This frame N is mounted to slide vertically between guides $n$ on the frame of the machine, and the lever-arm and links preferably work across their center of motion, as shown in Fig. 2, so as to raise and lock the idler-pulley elevated, or when moved in the opposite direction, as indicated in dotted lines, to lower the pulley and loosen the belt.

From the statements already made it will be seen that by drawing the handle of the breast-lift rod forward the idler-pulley will be lowered, the belt made slack, and as a part of the same movement the roll-box is raised and held in its raised position. A reverse movement of the handle restores the parts to working position and tightens the belt. The movement downward of the idler-pulley H is sufficiently greater than the upward movement of the float and pulley E to assure the loosening of the belt sufficiently to bring the float to rest instantly. Its range of movement depends and is accomplished on the proportioning of the lever-arm and links M.

The shaft $m$ is preferably adjustable in the idler-pulley frame, as shown in Fig. 4, where it is held by three set-screws $m'$ $m'$ and $m^2$, the two former being located in the frame above the shaft and the latter below and at the center, so that the shaft may be adjusted vertically and its inclination varied to secure uniform pressure without tending to bind.

While I have shown and described the drive-gear for the float at one end only of the gin, this mechanism may be duplicated at the opposite end, where greater power or a more even distribution of the pressure is desired, and hence I do not wish to be limited to its application to one end only of the shafts.

Obviously various mechanism may be employed for moving the idler-pulley, and said pulley may be moved to tighten or loosen the belt independently of the breast-lift rod. In Figs. 5, 6, 7, and 8 I have shown, more or less diagrammatically, some different forms of shifting mechanism which might be used. In Figs. 5, 7, and 8 the pulley is mounted, as in Figs. 1 to 4, in a frame N, guided in ways to move vertically on the main frame. In Fig. 5 toggle-links P P are interposed between the lower end of the frame N and a pivot $p$ in fixed position. A crank-arm P' on the breast-lift rod is connected with the center of the toggle by a link P², so as to draw the toggle up and across its center. In Fig. 7 a cam Q, bearing against the lower end of the frame N, is shown, and in Fig. 8 a segmental pinion R meshes with a rack-bar R', formed as an extension of the frame N. In Fig. 6 the pulley H is journaled in arms S of a rock-shaft S', and an operating-arm S² on the shaft is connected by a link S³ with a crank-arm S⁴ on the breast-lift rod. The pulley in this instance moves in the arc of a circle; but the effect of moving the breast-lift rod is as described in connection with Figs. 1 to 4.

In connection with this invention it will be noted that the driving-belt for the float is not tightened by the closing movement of the roll box or breast; but, on the contrary, the closing movement of the box would loosen the belt. A separate and, in effect, oppositely-operating mechanism tightens the belt, and the latter when in operative position has a tendency to hold the roll-box to its place. The roll-box can only be lifted when the driving-belt has been loosened.

Having thus described my invention, what

I claim as new, and desire to secure by Letters Patent, is—

1. In a gin such as described, the combination with a movable roll-box and float journaled therein, of a driving mechanism for the float constituting a means for holding the roll-box and float down in operative position; substantially as described.

2. In a gin such as described, the combination with a movable roll-box and float journaled therein, of a pulley on the float-shaft and a driving-belt passing around said pulley and constituting a means for holding the roll-box and float down in operative position; substantially as described.

3. In a gin such as described, the combination with a movable roll-box and float journaled therein, of a pulley on the float-shaft, a driving-belt passing around said pulley and constituting a means for holding the roll-box and float down in operative position and a movable idler-pulley for releasing the tension on said belt to permit the raising of the roll-box and float; substantially as described.

4. In a gin such as described, the combination with a roll-box hinged to be raised and lowered with relation to the saws, a float-shaft journaled in the roll-box to move therewith and a pulley on said float-shaft, of a drive-belt passing around said pulley and operating to hold the roll-box and float down in working position, a movable idler-pulley over which the belt passes, a mechanism for moving said pulley and means controlled by said mechanism for raising the roll-box and float when the pulley is moved to loosen the belt; substantially as described.

5. In a gin such as described, the combination with the saw-shaft hinged roll-box and float-shaft journaled in the roll-box and movable therewith, of a driving mechanism connecting the saw and float shafts, a controlling mechanism for the driving mechanism and means operated thereby for raising the roll-box and float when the driving mechanism is released; substantially as described.

6. In a gin such as described, the combination with the saw-shaft journaled in the main frame, a hinged roll-box, a float-shaft journaled in the roll-box and pulleys on said shafts, of a driving-belt passing around said pulleys in opposite directions and having sufficient slack to permit the roll-box and float to be raised and a movable idler for tightening the belt and drawing the roll-box and float down; substantially as described.

7. In a gin such as described, the combination with the saw-shaft, hinged roll-box, float-shaft journaled in the roll-box and movable therewith and pulleys on said shafts, of a driving-belt passing round said pulleys in opposite directions and two idler-pulleys so arranged that the belt passes from one to the saw-shaft pulley and from the other to the float-shaft pulley and means for moving one of said idler-pulleys to slacken the belt and permit the float to come to rest; substantially as described.

8. In a gin such as described, the combination with the hinged roll-box, float-shaft journaled therein, drive-belt for said float-shaft operating to hold the roll-box down and movable idler-pulley for the belt, of controlling mechanism for the idler-pulley and roll-box embodying means imparting a greater movement to the idler-pulley than to the roll-box whereby the belt will be slackened to a greater extent than will be taken up by the raising of the roll-box; substantially as described.

9. In a gin such as described, the combination with the saw-shaft journaled in the main frame, the hinged roll-box, the float-shaft journaled in the roll-box, the driving belt operating to hold the roll-box down, the movable idler for said belt and means for locking said idler with the belt under tension to maintain the roll-box and float in operative position.

10. In a gin such as described, the combination with the saw-shaft journaled in the main frame, the hinged roll-box, the float-shaft journaled in the roll-box, the movable idler-pulley and the drive-belt operating to hold the roll-box and float in operative position, of a controlling mechanism adapted to move the idler to slacken the belt and raise the roll-box, said controlling mechanism embodying means whereby it will be held at either extreme of its movement.

11. In a gin such as described, the combination with the hinged roll-box, float-shaft journaled therein, belt operating to drive the float-shaft and hold the box down and the movable idler for controlling the slack in the belt, of a roll-box-lift rod and operating connections between the rod and movable idler for moving the latter, said connections embodying a member adapted to move across its center of motion to lock the idler in position with the belt under tension.

12. In a gin such as described, the combination with the hinged roll-box, float-shaft journaled therein, belt operating to drive the float-shaft and hold the box down and the movable idler for controlling the slack in the belt, of a controlling mechanism for said idler embodying a member adapted to move across its center of motion to lock the idler in position with the belt under tension.

13. In a gin such as described, the combination with the hinged roll-box, float-shaft journaled therein, belt operating to drive the float-shaft and hold the box down and the movable idler for controlling the slack in the belt, of a controlling mechanism for the idler embodying a rock-shaft, a member on said shaft coöperating with the idler-support and adapted to move across its center of motion to lock the idler in position with the belt under tension; substantially as described.

14. In a gin such as described, the combination with the hinged roll-box, float-shaft journaled therein, belt operating to drive the float-shaft and hold the box down and the movable idler for controlling the slack in the belt, of a controlling mechanism for the idler embodying a movable frame in which the idler is mounted, a rock-shaft and members jointed together and connecting the rock-shaft and idler-frame, said member being adapted to work across their center of motion to hold the idler with the belt under tension.

15. In a gin such as described, the combination with the hinged roll-box, float-shaft journaled therein, belt operating to drive the float-shaft and hold the box down and the movable idler for controlling the slack in the belt, of a controlling mechanism for the idler embodying a movable frame in which the idler is journaled, a rock-shaft, an operating-arm on the rock-shaft and link connections between said arm and idler-frame adapted to work across their center of motion to lock the idler in position with the belt under tension.

RALPH E. WILSON.

Witnesses:
ENNIS MUNGER,
J. S. McANULTY.